L V DOUGLAS.
SULKY HIGH CHAIR.
APPLICATION FILED AUG. 26, 1912.
1,082,854.
Patented Dec. 30, 1913.
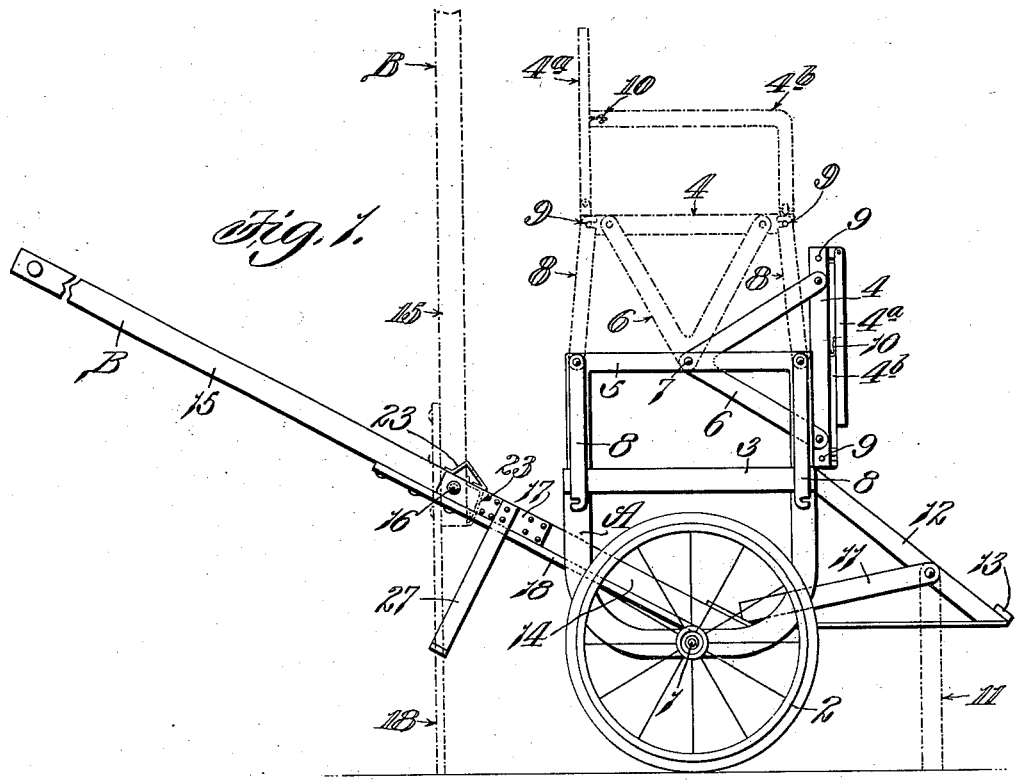
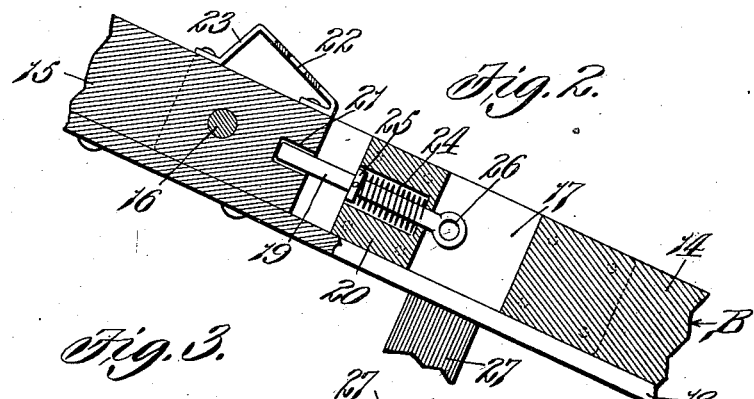
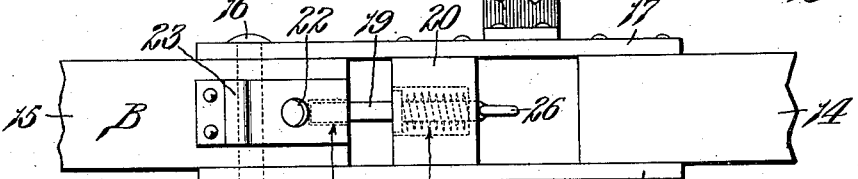
Witnesses:
Geo. R. Radson
Cora Badger
Inventor:
L. V. Douglas.
By Bakewell & Cornwall Attys.

UNITED STATES PATENT OFFICE.

L V DOUGLAS, OF WYMORE, NEBRASKA.

SULKY HIGH CHAIR.

1,082,854.  Specification of Letters Patent.  Patented Dec. 30, 1913.

Application filed August 26, 1912. Serial No. 717,188.

*To all whom it may concern:*

Be it known that I, L V DOUGLAS, a citizen of the United States, residing at Wymore, Nebraska, have invented a certain new and useful Improvement in Sulky High Chairs, of which the following is a full, clear, and exact description, such as will enable others skilled in the art to which it appertains to make and use the same.

This invention relates to children's carts of the type that can be converted into high-chairs.

The main object of my invention is to provide a two-wheeled cart or sulky of novel design that can be converted easily into a substantial, safe and comfortable high-chair.

Another object is to provide a device of the character described which can be used either as a push-cart or a pull-cart.

And still another object is to provide a convertible sulky and high-chair in which the tongue is so designed that it can be adjusted into position to act as a supporting leg when the vehicle is converted into a high-chair.

Other objects and desirable features of my invention will be hereinafter pointed out.

Figure 1 of the drawings is a side elevational view of a convertible sulky and high-chair constructed in accordance with my invention; Fig. 2 is an enlarged longitudinal sectional view showing the means that I prefer to use for locking the movable portion of the tongue in either of its adjusted positions; and Fig. 3 is a top plan view of the parts shown in Fig. 2.

Referring to the drawings which illustrate the preferred form of my invention, A designates a frame of any suitable type or design provided with an axle 1 on which two wheels 2 are mounted, and B designates a tongue composed of two sections or portions, one of which is connected to the frame A or axle 1 of the vehicle.

In the preferred form of my invention as herein shown, two separate and distinct seats are provided, one consisting of a permanent sulky seat 3 that is carried by the frame A and the other consisting of an adjustable high-chair seat 4 which is adapted to be arranged in such a position that it serves as a back for the sulky seat. The sulky seat 3 is provided with rigid arms or side-pieces 5 and the high-chair seat 4 is secured to said arms in such a manner that it can be arranged in substantially an upright position, as shown in Fig. 1, so as to serve as a back for the sulky seat or in a horizontal position above the sulky seat, as shown in broken lines in Fig. 1, when it is desired to convert the device into a high-chair. One convenient way of mounting the high-chair seat 4 is to fasten it to two substantially V-shaped side members 6 which are pivotally connected at 7 to the rigid side arms 5 of the sulky seat, thereby permitting the seat 4 to be swung upwardly into a horizontal position, as shown in broken lines in Fig. 1. The seat 4 is locked in its elevated or operative position by means of pivotally mounted latches 8 on the sulky-seat side arms 5 which are adapted to be swung upwardly into an upright position so as to engage studs or projections 9 that project laterally from the side edges of the seat 4. Any other suitable means may be used, however, for locking the high-chair seat 4 in its elevated position without departing from the spirit of my invention.

The high-chair seat 4 is provided with a back and side arms which are preferably arranged in such a manner that they can be folded down on the seat when the device is being used as a cart. Preferably, a back 4ª is hinged to the seat 4 in such a manner that it can be folded down upon said seat, as shown in full lines in Fig. 1, and two side arms 4ᵇ are hinged to the front portion of the seat 4 in such a manner that they can be folded down under the back 4ª, each of said side arms 4ᵇ having a vertically disposed portion whose lower end is connected to the seat and a horizontally disposed portion arranged at right angles to said vertically disposed portion. When the device is to be used as a high-chair the seat 4 is elevated and locked in position by means of the latches 8. The back 4ª is then swung upwardly into a vertical position, and the side arms 4ᵇ are raised and connected at their rear ends to the seats 4 by means of hooks 10 or other suitable fastening devices, as shown in broken lines in Fig. 1.

In order to hold the supporting frame A perfectly rigid when the device is being used as a high-chair I have provided the frame A with one or more pivotally mounted legs 11 which can be swung downwardly into operative position, as shown in broken lines in Fig. 1, and have formed the tongue B of the sulky in such a manner that one portion of same can be adjusted in position to serve as a supporting leg or standard, the legs 11 being arranged on one side of the axle 1 of the sulky and the adjustable portion of the tongue on the other side of said axle. In the form of my invention herein shown, the legs 11 are pivotally connected to the side stays 12 of a foot-rest 13 on the frame A but this is not essential as the legs 11 could be arranged in various other ways. The tongue B comprises a permanent section or portion 14 which is rigidly secured to the axle or to the frame A of the sulky and an adjustable or movable section 15, which is pivotally connected at 16 to forwardly projecting side straps or extensions 17 on the stationary portion 14 of the tongue, as shown clearly in Figs. 2 and 3. A leg 18 is rigidly connected to the under side of the adjustable portion 15 of the tongue in such a manner that it will extend rearwardly under the stationary portion 14 of the tongue when the device is being used as a sulky.

When it is desired to convert the device into a high-chair the movable portion 15 of the tongue is swung upwardly into a vertical or upright position, as shown in broken lines in Fig. 1, so that the leg 18 thereon will come in contact with the floor or ground on which the wheels 2 of the vehicle rest, thus holding the high-chair perfectly rigid.

Means is provided for locking the movable portion of the tongue in adjusted position, the locking means that I prefer to use for this purpose consisting of a spring-pressed plunger 19 arranged in a bearing 20 between the side straps or extensions 17 on the rigid portion of the tongue, and adapted to project into a socket 21 in the end of the adjustable portion 15 of the tongue when said portion is arranged in alinement with the rigid portion 14 of the tongue. When the adjustable portion of the tongue is swung upwardly into a vertical position the plunger 19 projects into an opening 22 in a bracket 23 that is fastened to the upper side of the adjustable portion 15 of the tongue adjacent the lower end of same. A coiled expansion spring 24 is arranged in a pocket in the bearing 20 between one end of said pocket and a collar 25 on the plunger 19, and said plunger is provided at its outer end with a ring or finger-piece 26 so as to enable it to be withdrawn easily. If desired, foot-rests 27 can be secured to the rigid portion of the tongue so as to support the feet of the child sitting on the seat of the sulky.

A device of the character above-described can be used as a sulky or pull-cart when the seat 4 that acts as a back for the sulky seat is arranged in the position shown in full lines in Fig. 1 or it can be used as a push-cart when said seat 4 is swung clear over to the opposite side of the sulky seat 3, and when it is desired to convert the device into a high-chair the seat 4 is swung upwardly into a horizontal position and locked, and the legs 11 and movable section of the tongue are adjusted in position so as to prevent the frame A from tilting, thus forming a perfectly rigid and safe high-chair whose seat is equipped with a back and side arms.

The device presents a neat and ornamental appearance, it is inexpensive to manufacture, and as it comprises only a few parts of simple design it can be converted quickly from a sulky into a high-chair and vice versa.

Having thus described my invention, what I claim as new and desire to secure by Letters Patent is:

1. A convertible two-wheeled sulky and high-chair consisting of a frame provided with a single axle on which are mounted a pair of wheels, a high-chair seat and a sulky-seat carried by said frame, a pair of folding legs on said frame arranged on one side of the axle, and a pulling tongue projecting forwardly from the opposite side of the axle, said tongue having a movable portion which is provided with an extension that coöperates with the pair of folding legs on the opposite side of the axle to form a three-point bearing that prevents the frame from tilting when the device is being used as a high-chair.

2. A convertible two-wheeled sulky and high-chair consisting of a frame provided with a single axle on which are mounted a pair of wheels, a high-chair seat and a sulky-seat carried by said frame, a pair of folding legs on said frame arranged on one side of the axle, a pulling tongue projecting forwardly from the opposite side of the axle, said tongue having a movable portion which is provided with an extension that coöperates with the pair of folding legs on the opposite side of the axle to form a three-point bearing that prevents the frame from tilting when the device is being used as a high-chair, a locking device combined with said tongue, and means on the movable portion of the tongue that coöperates with said locking device to hold said movable portion in certain positions.

In testimony whereof I hereunto affix my signature in the presence of two witnesses, this 22nd day of August 1912.

L V DOUGLAS.

Witnesses:
R. E. JONES,
J. A. REULING.